United States Patent
Droz et al.

(10) Patent No.: US 9,285,474 B2
(45) Date of Patent: Mar. 15, 2016

(54) PHOTODETECTOR ARRAY ON CURVED SUBSTRATE

(71) Applicant: Google Inc., Mountain View, CA (US)

(72) Inventors: Pierre-Yves Droz, Mountain View, CA (US); Gaetan Pennecot, San Francisco, CA (US); Timothy John Prachar, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 148 days.

(21) Appl. No.: 14/265,583

(22) Filed: Apr. 30, 2014

(65) Prior Publication Data

US 2015/0034809 A1    Feb. 5, 2015

Related U.S. Application Data

(63) Continuation of application No. 13/955,583, filed on Jul. 31, 2013, now Pat. No. 8,742,325.

(51) Int. Cl.
*G01S 17/02* (2006.01)
*G01J 1/04* (2006.01)
*G01J 1/42* (2006.01)

(52) U.S. Cl.
CPC ............... *G01S 17/02* (2013.01); *G01J 1/0411* (2013.01); *G01J 1/0448* (2013.01); *G01J 1/4228* (2013.01)

(58) Field of Classification Search
CPC ...... H01L 31/0352; H01L 27/00; H04N 3/14; H01J 5/02
USPC ................ 250/208.1, 239, 216, 214.1, 214 R
See application file for complete search history.

(56) References Cited

U.S. PATENT DOCUMENTS

| | | | |
|---|---|---|---|
| 3,790,277 A | 2/1974 | Hogan |
| 4,700,301 A | 10/1987 | Dyke |
| 4,709,195 A | 11/1987 | Hellekson et al. |
| 5,202,742 A | 4/1993 | Frank et al. |
| 5,606,167 A | 2/1997 | Miller |
| 5,834,771 A | 11/1998 | Yoon et al. |

(Continued)

FOREIGN PATENT DOCUMENTS

| | | |
|---|---|---|
| EP | 2410358 A1 | 1/2012 |
| JP | 2012-127952 | 7/2012 |
| WO | 2012010601 | 1/2012 |

OTHER PUBLICATIONS

International Search Report dated Nov. 18, 2014 of PCT/US2014/047846 filed Jul. 23, 2014.

(Continued)

*Primary Examiner* — Seung C Sohn
(74) *Attorney, Agent, or Firm* — McDonnell Boehnen Hulbert & Berghoff LLP

(57) ABSTRACT

In some applications, it may be desirable to position multiple photodetectors at precise locations on a curved focal surface defined by an optical system. To achieve this positioning, the photodetectors may be mounted at desired locations on a flexible substrate that is in a flat configuration. The flexible substrate with mounted photodetectors can then be shaped to substantially conform to the shape of the curved focal surface. This shaping can be accomplished by clamping the flexible substrate between at least two clamping pieces. The curved flexible substrate clamped between the at least two clamping pieces can be positioned relative to the optical system such that the photodetectors are positioned at desired three-dimensional locations on the curved focal surface.

20 Claims, 4 Drawing Sheets

(56) References Cited

U.S. PATENT DOCUMENTS

| | | | |
|---|---|---|---|
| 6,849,843 B2 | 2/2005 | Ansorge et al. | |
| 6,985,184 B2 | 1/2006 | Sato | |
| 7,089,114 B1 | 8/2006 | Huang | |
| 7,248,342 B1 | 7/2007 | Degnan | |
| 7,255,275 B2 | 8/2007 | Gurevich et al. | |
| 7,742,090 B2 | 6/2010 | Street et al. | |
| 7,786,421 B2 | 8/2010 | Nikzad et al. | |
| 7,969,558 B2 | 6/2011 | Hall | |
| 8,372,726 B2 | 2/2013 | de Graff et al. | |
| 8,389,862 B2 * | 3/2013 | Arora | H01L 23/528 174/254 |
| 8,482,093 B2 | 7/2013 | Tian et al. | |
| 8,742,325 B1 | 6/2014 | Droz et al. | |
| 8,884,815 B2 * | 11/2014 | Gritz | H01Q 19/062 342/351 |
| 2001/0020671 A1 | 9/2001 | Ansorge et al. | |
| 2005/0211919 A1 | 9/2005 | Galburt et al. | |
| 2007/0181810 A1 | 8/2007 | Tan et al. | |
| 2007/0182549 A1 | 8/2007 | Qi | |
| 2010/0264502 A1 | 10/2010 | Christophersen et al. | |
| 2011/0216304 A1 | 9/2011 | Hall | |
| 2012/0261551 A1 | 10/2012 | Rogers | |
| 2013/0050015 A1 | 2/2013 | Black et al. | |

OTHER PUBLICATIONS

Iwert et al., "The challenger of highly curved monolithic imaging detectors," Proc. SPIE, vol. 7742, pp. 774227-774229 (2010).

"Flexi Detectors Sharpen Pics," Photonics.com, Jan. 14, 2008, http://www.photonics.com/Articleaspx?AID=35991.

Rim et al., "The optical advantages of curved focal plane arrays," Optics Express, vol. 16, pp. 4965-4971 (2008).

* cited by examiner

PHOTODETECTOR ARRAY ON CURVED SUBSTRATE

CROSS REFERENCE TO RELATED APPLICATIONS

The present application is a continuation of U.S. patent application Ser. No. 13/955,583, filed Jul. 31, 2013, which application is incorporated herein by reference.

BACKGROUND

Unless otherwise indicated herein, the materials described in this section are not prior art to the claims in this application and are not admitted to be prior art by inclusion in this section.

A light detection and ranging (LIDAR) device can detect objects in its environment by transmitting light into the environment and receiving a portion of the transmitted light that has reflected from the objects in the environment back toward the LIDAR device. The received light can be detected by one or more photodetectors. For example, the LIDAR device can include an optical system that focuses the received light onto one or more photodetectors.

SUMMARY

In one aspect, example embodiments provide an apparatus that includes an optical system that defines a focal surface having a curved shape, a flexible substrate, a plurality of photodetectors mounted on the flexible substrate, and a clamp. The clamp includes at least a first clamping piece and a second clamping piece. The first clamping piece has a convex surface that corresponds to the curved shape of the focal surface. The second clamping piece has a concave surface that corresponds to the curved shape of the focal surface. The clamp is configured to hold the flexible substrate between the first and second clamping pieces such that the flexible substrate substantially conforms to the curved shape of the focal surface and each of the photodetectors in the plurality of photodetectors is at a respective location on the focal surface.

In another aspect, example embodiments provide a method. The method involves mounting a plurality of photodetectors on a flexible substrate in a flat configuration such that each photodetector has a respective two-dimensional location on the flexible substrate. The method further involves curving the flexible substrate with the plurality of photodetectors mounted thereon such that the curved flexible substrate substantially conforms to a curved focal surface defined by an optical system. Still further, the method involves positioning the curved flexible substrate relative to the optical system such that each photodetector in the plurality of photodetectors is at a respective three-dimensional location on the focal surface.

In yet another aspect, example embodiments provide a system that includes means for mounting a plurality of photodetectors on a flexible substrate in a flat configuration such that each photodetector has a respective two-dimensional location on the flexible substrate, means for curving the flexible substrate with the plurality of photodetectors mounted thereon such that the curved flexible substrate substantially conforms to a curved focal surface defined by an optical system, and means for positioning the curved flexible substrate relative to the optical system such that each photodetector in the plurality of photodetectors is at a respective three-dimensional location on the focal surface.

DETAILED DESCRIPTION

Figure 1:
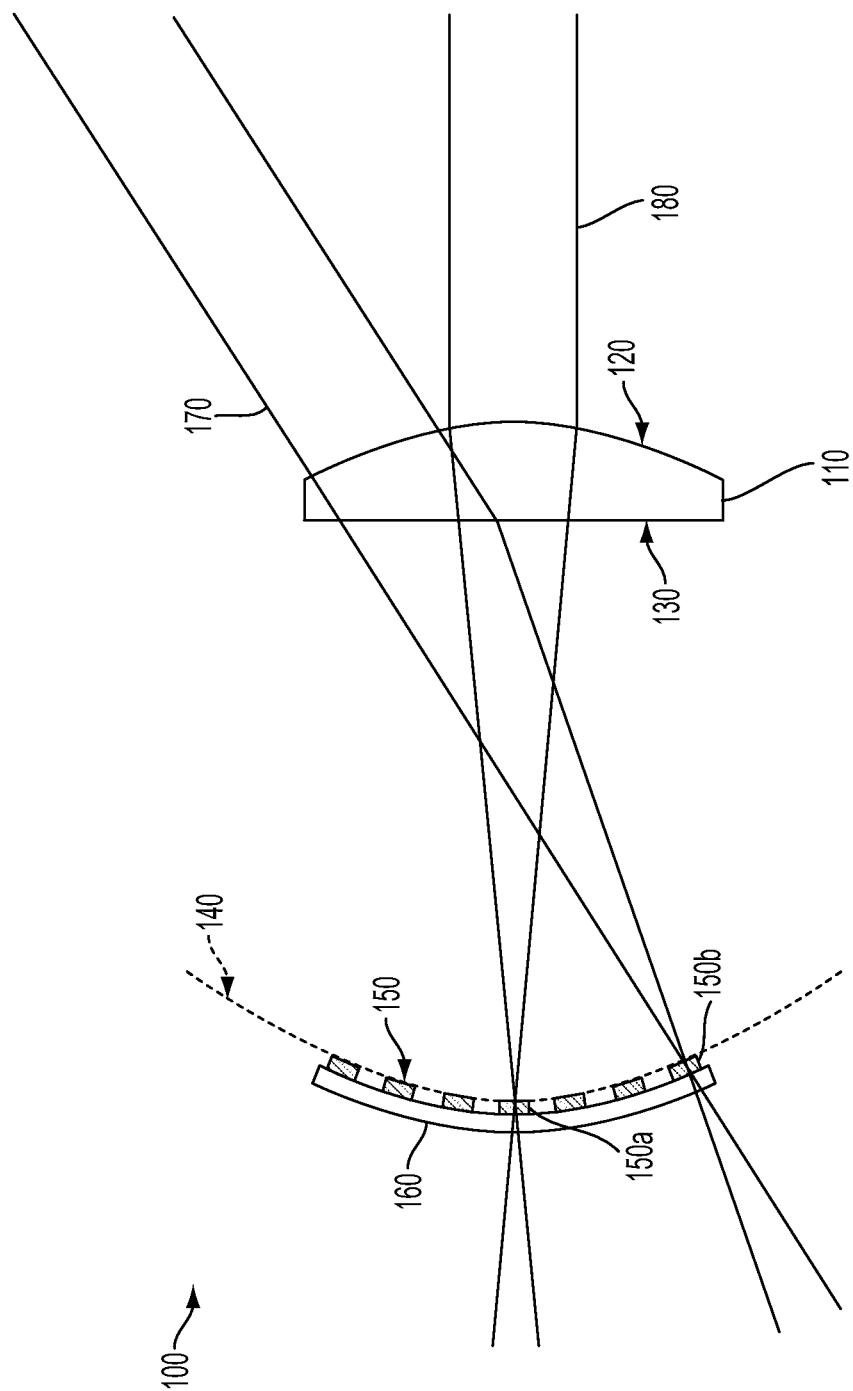
FIG. 1 is a schematic diagram of an apparatus that includes an optical system and an array of photodetectors positioned on a focal surface defined by the optical system, in accordance with an example embodiment.

The following detailed description describes various features and functions of the disclosed systems, devices and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

In some applications, it may be desirable to position multiple photodetectors (e.g., avalanche photodiodes) at precise locations on a curved focal surface defined by an optical system. To achieve this positioning, the photodetectors may be mounted at desired locations on a flexible printed circuit board (PCB) or other flexible substrate that is in a flat configuration. The mounting process can be performed using a die bonder machine or other computer controlled "pick and place" system that can provide accurate 2-d placement of the photodetectors on the substrate.

The flexible substrate with mounted photodetectors can then be shaped to substantially conform to the shape of the curved focal surface. This shaping can be accomplished by clamping the flexible substrate between two clamping pieces. One clamping piece can have a convex surface that corresponds to the shape of the curved focal surface, and the other clamping piece can have a concave surface that corresponds to the shape of the curved focal surface. When the flexible substrate is held between the clamping pieces, the flexible substrate conforms to the curved shape of the convex and concave surfaces of the clamping pieces.

The clamping pieces can be held together with the flexible substrate between them by bolting the clamping pieces together or by other means. In addition, dowel pins can be inserted through corresponding holes in the clamping pieces and flexible substrate to provide a desired lateral placement of the flexible substrate relative to the clamping pieces.

A non-limiting example application is the detection of a plurality of returning light pulses in a light detection and ranging (LIDAR) system. A LIDAR system can detect the location of one or more objects in its environment by transmitting incident pulses of light into the environment, detecting returning pulses reflected from one or more objects in the environment, and determining the distance to the one or more objects based on a time delay between the transmission of the incident pulses and the reception of the corresponding reflected pulses. By transmitting incident pulses of light and measuring the time delay in a plurality of directions, a "point cloud" map of the environment can be developed.

It is to be understood that LIDAR is merely an example application. The apparatus and methods described herein can be used in any application where photodetectors are used to detect light at a curved focal surface.

FIG. 1 illustrates an example apparatus 100 that includes an optical system and multiple photodetectors positioned on a curved focal surface defined by the optical system. In this example, the optical system is shown as a lens 110 having an aspheric surface 120 and a toroidal surface 130. The lens 110 is configured to focus light onto a curved focal surface 140. Multiple photodetectors 150 are mounted on a flexible substrate 160 which is positioned and curved so that the photodetectors 150 are located on the curved focal surface 140.

In apparatus 100, lens 110 can focus light coming from different directions onto different respective photodetectors in photodetectors 150. As shown in FIG. 1, an incoming beam of light 170 is refracted by the lens 110 such that it comes into focus on a corresponding photodetector 150a on the curved focal surface 140. Another incoming beam of light 180, which is at an angle to the optical axis of the lens 110, is refracted by the lens 110 such that it comes into focus on a corresponding photodetector 150b on the curved focal surface 140.

Although in the example of FIG. 1 the optical system is shown as a lens 110 with a particular shape, an optical system could include other types of lenses and/or other elements to provide a curved focal surface. For example, the optical system could include one or more reflective, refractive, or diffractive elements. The optical system could also include one or more filtering elements, polarizing elements, or optically nonlinear elements. Further, the optical system could include a combination of one or more of each of the optical elements listed above or of unmentioned optical elements familiar to one skilled in the art. The arrangement of the combination need not have a single common optical axis or be symmetric about any axis.

The optical system (e.g., lens 110) could also perform other functions. For instance, a LIDAR system may include one or more light sources that transmit light through the optical system. Further, each light source may be paired with a corresponding photodetector in photodetectors 150, such that light transmitted by the light source through the optical system and reflected by an object in the environment is focused onto its corresponding photodetector by the optical system.

The specific focal surface 140 shown in FIG. 1 is used for illustration purposes only and is not meant to constrain the possible arrangement of the photodetectors 150 or the configuration of the optical system. The focal surface 140 need not be symmetric about an axis of rotation or have a plane of symmetry (as implied in FIG. 1). Indeed, the focal surface 140 can be any curved surface provided by an optical system.

The regular arrangement of the photodetectors 150 on the flexible substrate 160 as shown in FIG. 1 is intended to serve as an illustrative example. In general, the placement of the photodetectors 150 on the flexible substrate 160 need not be regular, but may be any pattern according to the requirements of a specific application. For instance, if the apparatus 100 was part of a LIDAR system attached to a vehicle, it might be useful to have higher-resolution information regarding an area of particular interest in the environment of the vehicle. As a result, the photodetectors 150 might be more densely distributed on the flexible substrate 160 in locations corresponding to the area of particular interest.

Figure 2:
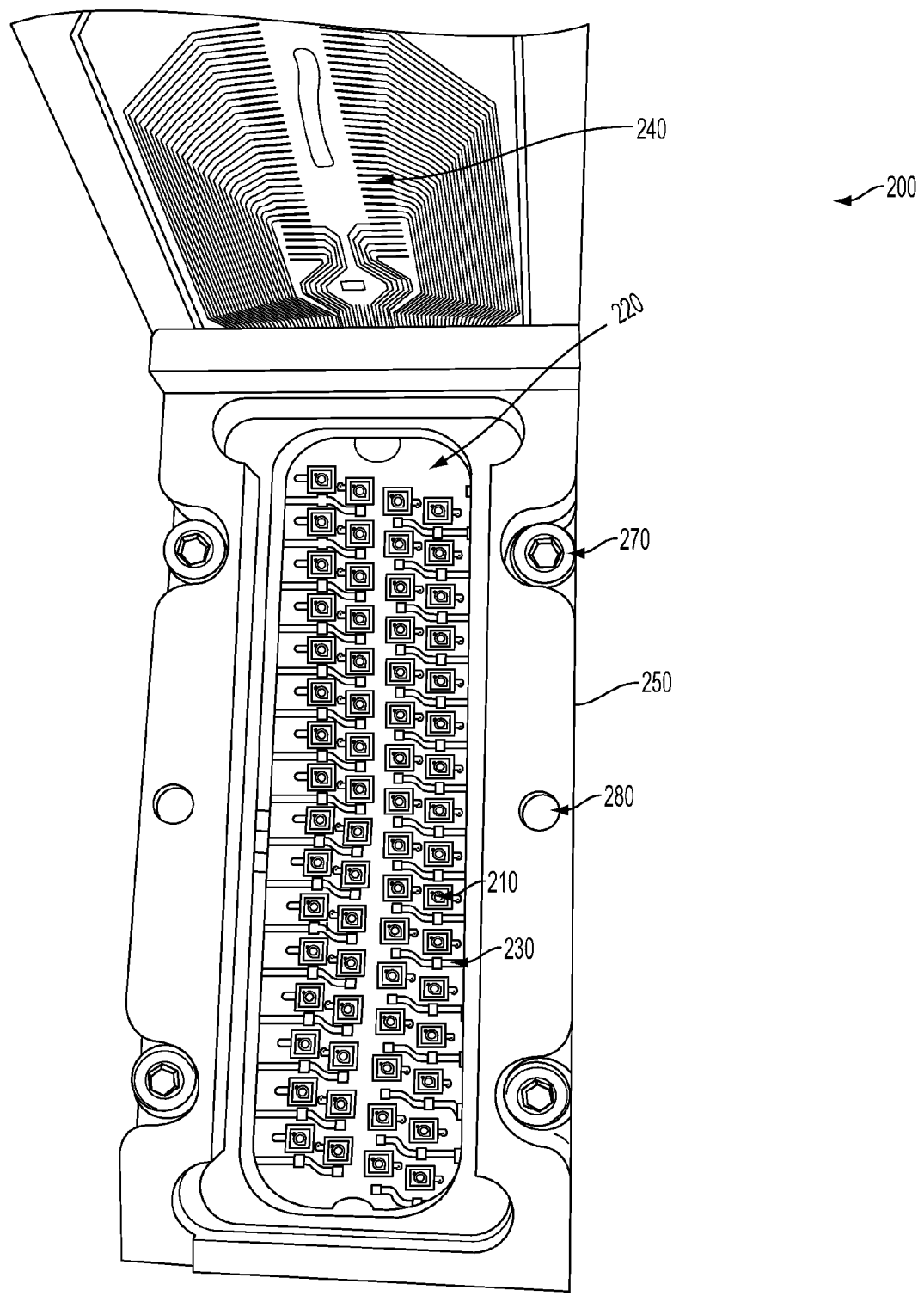
FIG. 2 is a top view of an assembly that includes an array of photodetectors on a flexible substrate held between two clamping pieces, in accordance with an example embodiment.
Figure 3:
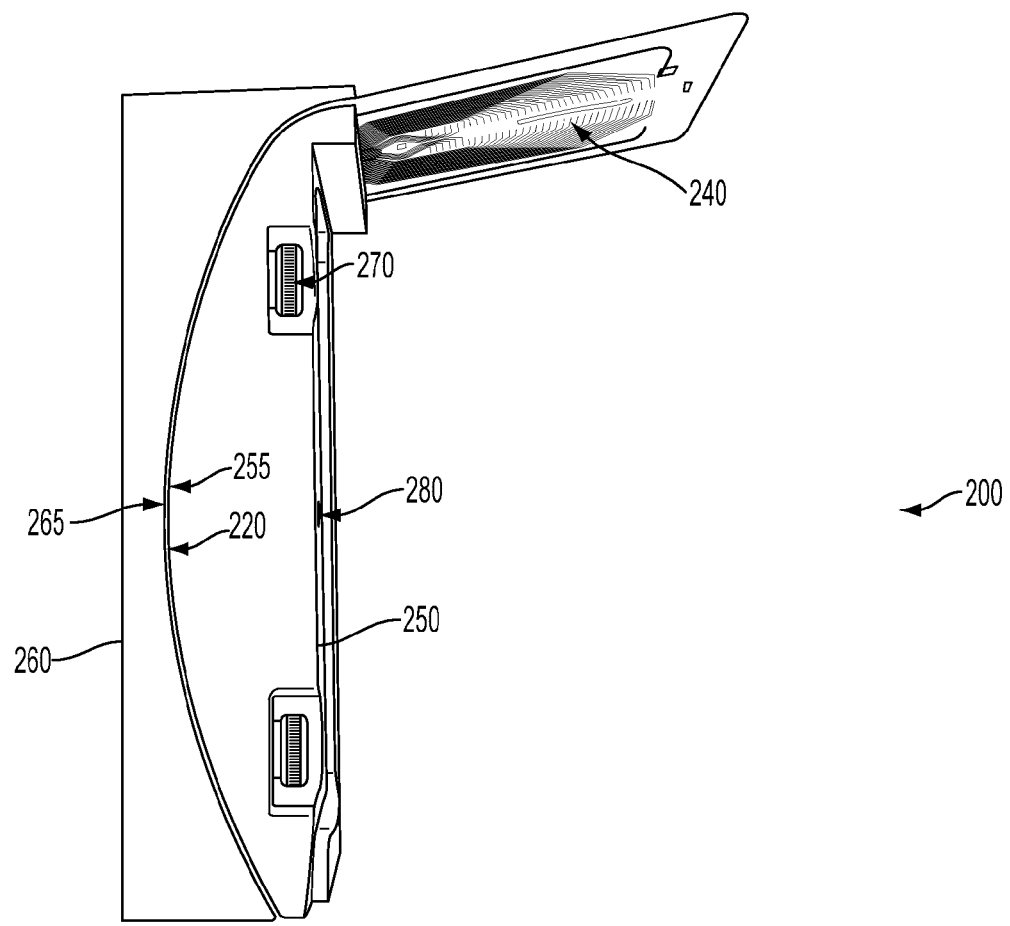
FIG. 3 is a side view of the assembly of FIG. 2, in accordance with an example embodiment.

FIGS. 2 and 3 show a non-limiting example assembly 200, in which an array of photodetectors 210 are positioned on a curved surface corresponding to a focal surface of an optical system (not shown). FIG. 2 shows a top view of the assembly 200, and FIG. 3 shows a side view. The assembly 200 includes an array of photodetectors 210 mounted on a flexible PCB 220 and connected to respective conductive traces 230 on the flexible PCB 220. The conductive traces 230 are electrically connected to a connector 240 on the flexible PCB 220. In this example, the photodetectors 210 are avalanche photodiodes, and they are arranged in four staggered parallel rows. This arrangement could correspond to a plurality of light sources of a LIDAR system (not shown) in which each photodetector is paired with a corresponding light source.

In one example, assembly 200 is used with a lens. Assembly 200 can be used in an apparatus, such as apparatus 100 shown in FIG. 1, in which a lens or other optical system provides the curved focal surface. The lens can have an aspheric surface and a toroidal surface. The toroidal surface can have a first curvature corresponding to a direction parallel to the rows of the photodetectors 210 and a second curvature corresponding to a direction perpendicular to the rows of the photodetectors 210.

The flexible PCB 220 is clamped between an upper clamping piece 250 and a lower clamping piece 260 and the clamping pieces are secured together by bolts 270. As shown in FIG. 3, the upper clamping piece 250 includes a curved convex surface 255 and the lower clamping piece 260 includes a curved concave surface 265. These curved surfaces correspond to each other and to the curved shape of the focal surface. The flexible PCB 220 is formed into the curved shape of the focal surface by placing it between the upper 250 and lower 260 clamping pieces and securing the clamping pieces together by bolts 270. By being clamped between curved surfaces whose shape corresponds to the curved focal surface of the optical system, the flexible PCB 220 positions the photodetectors 210 mounted on it to be located on a curved shape in space corresponding to the curved focal surface of the lens or other optical system.

As shown in FIG. 2, a pair of alignment holes 280 can extend through upper clamping piece 250, flexible PCB 220, and into lower clamping piece 260. Alignment holes 280 can receive corresponding dowel pins to mechanically secure the alignment of the flexible PCB 220 relative to the clamping pieces 250, 260. The system of dowel pins and holes may also serve to aid in assembly of the example apparatus 200.

As shown in FIGS. 2 and 3, the example apparatus 200 includes an upper clamping piece 250 and a lower clamping piece 260 which are each a single machined component. This is not intended to limit the form of the clamping pieces used in an embodiment; an upper clamping piece and/or a lower clamping piece may each be made of one or more components so long as the components of the upper clamping piece and the components of the lower clamping piece can be secured together around the flexible substrate to form the flexible substrate into the curved shape of a focal surface.

The clamping pieces 250, 260 in the example assembly 200 are shown secured together using bolts 270, but this is intended as a non-limiting example. The clamping pieces may be attached by other means, including any of a clip, an adhesive, a weld, an external clamp, a magnet or magnets, an external application of a hydraulic or a pneumatic pressure, or another method of attaching components familiar to one skilled in the art.

Further, use of alignment holes 280 and corresponding dowel pins is intended as a non-limiting example way to position the substrate 220 relative to the clamping pieces 250, 260. The position and number of the holes may be different from the example apparatus 200. The holes may fully or partially penetrate one or both of the clamping pieces. The dowels may be separate from the clamping pieces or they may be part of the construction of one or both of the clamping pieces. The dowels may remain as part of the assembly or may only be used during manufacture and later removed. Alternative methods of aligning the substrate with the clamping pieces that do not rely on alignment holes or dowel pins can also be used.

In one example, the photodetector elements 210 positioned on the flexible PCB 220 in the example assembly 200 are avalanche photodiodes. In other examples, the photodetector elements could include phototransistors, avalanche phototransistors, photodiodes, photovoltaic cells, photoresistors, pyroelectric detectors, CMOS active pixel sensors, CCD elements or any other photodetector element familiar to one skilled in the art. Further, the plurality of photodetector elements need not include only one type of sensor, but may include a mix of different types. Further, the photodetectors could be configured to detect wavelengths of light in the visible, ultraviolet, and/or infrared portions of the electromagnetic spectrum. In some examples, a filter may be placed over the photodetectors in order to limit the wavelengths that reach the photodetectors.

Further, the electrical connection of the photodetectors 210 to a detection system may be accomplished in other ways than the respective conductive traces 230 and connector 240 on the flexible PCB 220. For example, the photodetectors may be connected to the detection system by individual wiring or cabling which may be independent from or in some way mechanically or electrically bonded to the flexible substrate or the clamping pieces. The connection may also be accomplished by RF microstrip lines which may be independent from or patterned on the flexible substrate. The photodetectors may also be connected by other methods not listed but familiar to one skilled in the art. The mounting of the photodetectors on the flexible substrate may be accomplished by the bonding with respective traces as in the example, or it may be accomplished by the use of an adhesive or other method familiar to one skilled in the art.

The photodetectors 210 in the example assembly 200 are arranged on the flexible substrate 220 with regular spacing in staggered parallel rows; however, an embodiment of the claims may arrange the photodetectors on the flexible substrate in any pattern according to a desired sampling of an optical field of an optical system. The arrangement may consist of only one row or a plurality of rows; the arrangement of the photodetectors within a row may be regular or having an arbitrary spacing. The photodetectors may be arranged in a square, hexagonal, or other regularly tessellated pattern, or arranged in an irregular pattern.

The flexible substrate in the example assembly 200 shown in FIGS. 2 and 3 is a flexible PCB 220. However, other flexible substrates could be used. The substrate may be metallic, and may be configured to act as a ground plane to shield the photodetectors from electrical noise. The flexible substrate may also be made of other materials which are able to be flexed to conform to a curved optical surface defined by an optical system and to which the photodetectors can be adhered at specified positions.

The curving of the flexible PCB 220 between the clamping pieces 250, 260 as shown in FIG. 3 is intended to illustrate one possible embodiment of the claimed apparatus. The curving may be according to any curve corresponding substantially to a curved focal surface of an optical system. Further, the curving need not be in only one direction, but may be in two directions according to the ability of a flexible substrate to flex. The curving may be parallel to the direction of a row of photodetectors on the substrate or at any angle relative to the arrangement of the photodetectors on the substrate. The curving may also be in multiple directions.

The preciseness of the matching between the curved shape of the optical system's focal surface and the curved shape of the PCB 220 in the clamping pieces can also vary, for example, depending on how precise of a focus is to be achieved at the photodetector 210 on the curved PCB 220. For example, photodetectors 210 may each have a sufficiently large light-sensitive area such that a certain amount of imprecision in the focusing of light onto the photodetectors 210 may be acceptable. As a result, some amount of offset between the positions of the photodetectors 210 relative to the optical system's focal surface may be tolerable.

Figure 4:
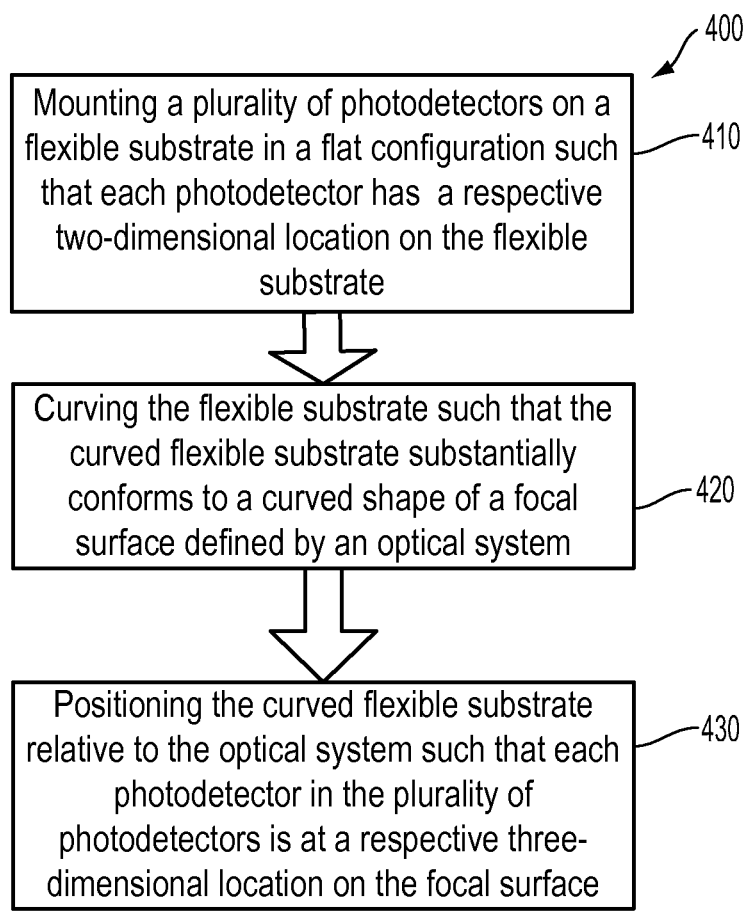
FIG. 4 is a flow chart of a method for positioning photodetectors on a curved focal surface, in accordance with an example embodiment.

FIG. 4 shows a non-limiting example method 400 for placing photodetectors at respective three-dimensional locations on a curved focal surface. The method 400 includes mounting a plurality of photodetectors on a flexible substrate in a flat configuration (block 410), curving the flexible substrate such that the curved flexible substrate substantially conforms to a curved shape of a focal surface defined by an optical system (block 420), and positioning the curved flexible substrate relative to the optical system such that each photodetector in the plurality of photodetectors is at a respective three-dimensional location on the focal surface (block 430).

In an example implementation of method 400, mounting the plurality of photodetectors on a flexible substrate in a flat configuration (block 410) includes placing avalanche photodiodes in parallel rows on a flexible PCB using a pick-and-place machine and then die-bonding the photodiodes to respective conductive traces on the PCB. The arrangement of the photodetectors into rows is meant as an example embodiment of the method 400 and not a limitation. The photodetectors may be arranged in a single row or in a repeating square or hexagonal pattern or another pattern.

As a further example of method 400, curving the flexible substrate such that the curved flexible substrate substantially conforms to a curved shape of a focal surface defined by an optical system (block 420) can include clamping the flexible PCB between two clamping pieces. One of the clamping pieces has a convex surface that corresponds to the shape of a curved focal surface provided by the lens, and the other of the clamping pieces has a concave surface that corresponds to the shape of the curved focal surface. The flexible PCB and clamping pieces include corresponding alignment holes. Dowels are inserted through the alignment holes in the flexible PCB and the clamping pieces to secure the location of the flexible PCB relative to the clamping pieces. The flexible PCB is then formed into the shape of the curved focal surface by being pressed between the clamping pieces. The clamping pieces are then bolted together. These actions cause the photodiodes mounted on the flexible PCB to lie along a curved surface in space that corresponds to the curved shape of the focal surface of an optical system.

An example of positioning the curved flexible substrate relative to the optical system such that each photodetector in the plurality of photodetectors is at a respective three-dimensional location on the focal surface (block 430) can include mounting the clamping pieces with the flexible PCB held between at one location in a housing and mounting the optical assembly at another location in the housing. When mounted at these locations, the flexible PCB can be positioned at the curved focal surface defined by the optical system. In some examples, the housing can be part of a LIDAR platform. In some examples, the optical system can include a lens, such as a lens with an aspheric surface and a toroidal surface.

The described mounting of avalanche photodiodes on a flexible PCB is intended as a non-limiting example embodiment of the method 400. For instance, the avalanche photodiodes are a specific example of a type of photodetector which could be used. The photodetectors used could include phototransistors, avalanche phototransistors, photodiodes, photovoltaic cells, photoresistors, pyroelectric detectors, CMOS active pixel sensors, CCD elements or any other photodetector element familiar to one skilled in the art. Further, the photodetectors mounted on the flexible substrate could include a number of types of photodetector. The photodetectors could be configured to detect wavelengths of light in the visible, ultraviolet, and/or infrared portions of the electromagnetic spectrum. In some examples, a filter could be placed over the photodetectors in order to limit the wavelengths that reach the photodetectors.

Further, the flexible substrate could be a flexible PCB, or could be made of any flexible material which may or may not be wholly or partially electrically conductive. As an alternative to the die-bonding used in the example implementation, the mounting of the photodetectors on the flexible substrate may include the use of an adhesive or other methods of mounting familiar to one skilled in the art. Further, the electrical connection of the photodetectors to a detection system may include discrete wires, microstrip lines or other methods familiar to one skilled in the art which may be independent from or built onto the flexible substrate.

Clamping the flexible substrate between two curved clamping pieces is just one possible embodiment of the method 400. For example, a rigid mechanical component could have a curved surface that corresponds to the curved shape of a curved focal surface. An adhesive could be used to secure the flexible substrate to the rigid component such that the position of the photodetectors mounted on the flexible substrate substantially conforms to the curved shape of the focal surface. Another non-limiting example can use a machined component with a curved slot whose curve matches a curved shape of a curved focal surface. The flexible substrate with mounted photodetectors could be inserted into the curved slot such that the photodetectors are located on a curved surface corresponding to the curved focal surface. Alternatively, any methods for curving a flexible substrate into a specified shape and maintaining that curving which are known to one skilled in the art may be employed to effect the curving of the substrate into the shape of the curved focal surface of the optical system as claimed.

Similarly, the use of clamping pieces to curve the flexible substrate along a direction parallel to the rows of the photodetectors is meant as a non-limiting example of curving the substrate to conform to the shape of the curved focal surface. The substrate could be curved in a direction perpendicular to the rows of the photodetectors or it could be curved in both directions. Further, the substrate could be curved in any direction or directions relative to the arrangement of the photodetectors on the flexible substrate such that the location of the photodetectors corresponds to the curved shape of the focal surface of the optical system.

If clamping pieces are used to curve the flexible substrate, they may be attached to each other as described in the example embodiment (i.e., with bolts) or they may be attached by other methods. For example, the clamping pieces may be attached with any of a clip, a weld, an adhesive, a magnet or magnets, a hydraulic or a pneumatic force, or another method of attachment familiar to one skilled in the art.

Note that the ordering of steps in the example embodiment 400 shown in FIG. 4 is intended for illustration purposes only and does not constrain the possible implementation of the methods as claimed. The steps may be performed in any order or steps may occur simultaneously.

While various example aspects and example embodiments have been disclosed herein, other aspects and embodiments will be apparent to those skilled in the art. The various example aspects and example embodiments disclosed herein are intended for purposes of illustration and are not intended to be limiting, with the true scope and spirit being indicated by the following claims.

What is claimed is:

1. An apparatus, comprising:
    an optical system, wherein the optical system defines a focal surface having a curved shape;
    a flexible printed circuit board (PCB);
    a plurality of photodetectors mounted on the flexible PCB; and
    a holder configured to hold the flexible PCB such that the flexible PCB substantially conforms to the curved shape of the focal surface and each of the photodetectors in the plurality of photodetectors is at a respective location on the focal surface.

2. The apparatus of claim 1, wherein the holder comprises at least a first clamping piece and a second clamping piece, wherein the first clamping piece has a convex surface that corresponds to the curved shape of the focal surface, and wherein the second clamping piece has a concave surface that corresponds to the curved shape of the curved focal surface.

3. The apparatus of claim 2, wherein the holder is configured to hold the flexible PCB between the first and second clamping pieces.

4. The apparatus of claim 1, wherein the flexible PCB comprises a plurality of alignment holes, and wherein the holder comprises a plurality of dowel pins extending through the plurality of alignment holes so as to position the flexible PCB relative to the holder.

5. The apparatus of claim 1, wherein each photodetector in the plurality of photodetectors comprises a respective avalanche photodiode.

6. The apparatus of claim 1, wherein the optical system comprises a lens.

7. The apparatus of claim 6, wherein the lens has an aspheric surface and a toroidal surface.

8. The apparatus of claim 7, wherein the photodetectors in the plurality of photodetectors are arranged in a plurality of rows, wherein the toroidal surface has a first curvature in a direction parallel to the rows and a second curvature in a direction perpendicular to the rows.

9. The apparatus of claim 1, wherein the flexible PCB comprises a connector and a plurality of conductive traces, wherein the plurality of conductive traces electrically connect the plurality of photodetectors to the connector.

10. The apparatus of claim 1, wherein the apparatus comprises a light detection and ranging (LIDAR) system.

11. The apparatus of claim 10, further comprising a plurality of light sources, wherein the light sources are configured to transmit light through the optical system into an environment.

12. The apparatus of claim 11, wherein each light source in the plurality of light sources is paired with a corresponding photodetector in the plurality of photodetectors, such that light transmitted through the optical system and reflected by an object in the environment is focused onto its corresponding photodetector by the optical system.

13. A method, comprising:
    transmitting, by a plurality of light sources, light through an optical system into an environment, wherein each light source in the plurality of light sources is paired with a corresponding photodetector in a plurality of photodetectors; and
    receiving, by the optical system, light that has been transmitted by a light source in the plurality of light sources and reflected by an object in the environment;

focusing, by the optical system, the received light onto the light source's corresponding photodetector in the plurality of photodetectors, wherein the optical surface defines a focal surface having a curved shape, wherein the photodectors are mounted on a flexible substrate, and wherein the flexible substrate is held by a holder such that the flexible substrate substantially conforms to the curved shape of the focal surface and each of photodetectors in the plurality of photodetectors is at a respective location on the focal surface.

14. The method of claim 13, wherein the holder comprises a first clamping piece and a second clamping piece, wherein the first clamping piece has a convex surface that corresponds to the curved shape of the focal surface, and wherein the second clamping piece has a concave surface that corresponds to the curved shape of the focal surface.

15. The method of claim 14, wherein the flexible substrate is held between the first and second clamping pieces.

16. The method of claim 13, wherein the flexible substrate comprises a flexible printed circuit board (PCB).

17. The method of claim 13, wherein the optical system comprises a lens.

18. The method of claim 17, wherein the lens has an aspheric surface and a toroidal surface.

19. The method of claim 18, wherein the photodetectors in the plurality of photodetectors are arranged in a plurality of rows, wherein the toroidal surface has a first curvature in a direction parallel to the rows and a second curvature in a direction perpendicular to the rows.

20. The method of claim 13, wherein each photodetector in the plurality of photodetectors comprises a respective avalanche photodiode.

* * * * *